United States Patent [19]

Buttermann, III

[11] Patent Number: 4,562,081

[45] Date of Patent: Dec. 31, 1985

[54] METHOD OF MAKING AN ICE CREAM SUNDAE

[76] Inventor: Garry G. Buttermann, III, 7704 Briarwood Dr., Crestwood, Ky. 40014

[21] Appl. No.: 600,167

[22] Filed: Apr. 13, 1984

[51] Int. Cl.⁴ .......................... A23G 9/00; A23G 9/24
[52] U.S. Cl. .................................... 426/101; 426/130; 426/565; 426/249
[58] Field of Search ............... 426/100, 101, 249, 130, 426/565, 566, 567

[56] References Cited

U.S. PATENT DOCUMENTS

| | | | |
|---|---|---|---|
| 2,005,245 | 6/1935 | Stoves | 426/101 |
| 4,189,502 | 2/1980 | Rubenstein | 426/249 |
| 4,225,623 | 9/1980 | Stussi | 426/130 |

FOREIGN PATENT DOCUMENTS

| | | | |
|---|---|---|---|
| 1043769 | 12/1978 | Canada | 426/249 |
| 0721065 | 3/1980 | U.S.S.R. | 426/101 |

OTHER PUBLICATIONS

Family Circle Illustrated Library of Cooking, vol. 15, 1972, pp. 1811–1817, 1827–1830.

*Primary Examiner*—Jeanette M. Hunter
*Attorney, Agent, or Firm*—Charles G. Lamb

[57] ABSTRACT

A method for making an ice cream sundae including the steps of adding ice cream to a container and pumping a topping onto the ice cream in the container wherein the topping has a viscosity of from about 1000 cps to about 18,000 cps, and solids content of from about 40 to about 70 percent by weight of the topping. In a further embodiment wherein the topping contains fruit the viscosity of the topping is from about 4 to about 12 Bostwick units.

20 Claims, 1 Drawing Figure

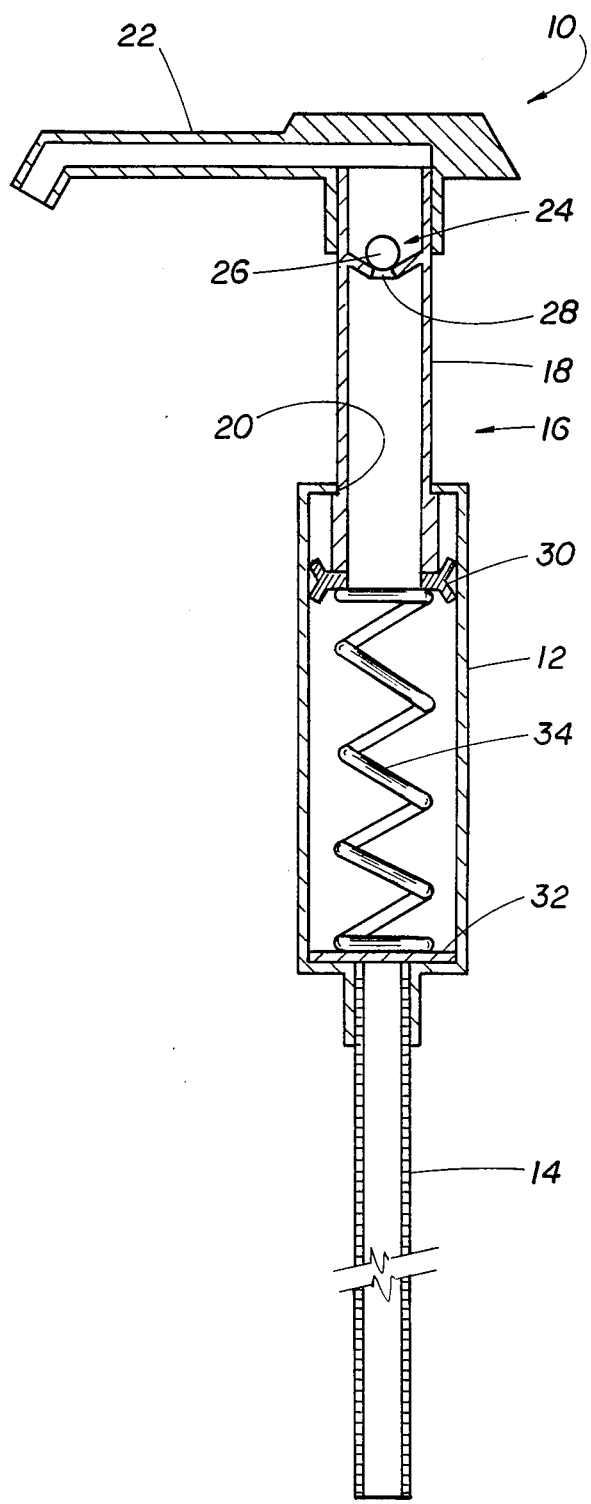

METHOD OF MAKING AN ICE CREAM SUNDAE

BACKGROUND OF THE INVENTION

1. Field of the Invention

The present invention relates to making desserts, and more particularly to making ice cream sundaes and the like. The present invention is particularly useful in commercial businesses allowing customers to make their own ice cream sundae.

2. Description of the Prior Art

It is well known in the art to make ice cream sundaes and the like by scooping ice cream into a container and then spooning the topping over the ice cream. It is also known to dispense the topping onto the ice cream by pumping it from a container. However, with known toppings the nozzles of the pumps become readily clogged and, therefore, need frequent cleaning.

SUMMARY OF THE INVENTION

The present invention provides a method of making an ice cream sundae utilizing a topping which can be dispensed to the ice cream by pumping and which does not readily clog the nozzles of the pump.

In one advantageous embodiment, the present invention provides a method for making an ice cream sundae comprising the steps of adding ice cream to a container and pumping a topping onto the ice cream, the topping having a viscosity of from about 1000 to about 18,000 cps and a solids content of from about 40 to about 70 percent by weight of the topping. In another advantageous embodiment, the present invention provides a method for making an ice cream sundae comprising the steps of adding ice cream to a container and pumping a topping onto the ice cream, the topping having a viscosity of from about 4 to about 12 Bostwick unit and solids content of from about 40 to about 50 percent by weight of the topping.

The Bostwick viscosity measurements were determined as follows. A container of each topping was equilibrated at a predetermined temperature of 72° F. A Bostwick consistometer, which is a housing having an open compartment therein with a vertically extending gate in one wall which extends from a bottom wall a preselected distance upwardly, was leveled and the gate of the consistometer was fixed in the lowered position to seal the sample compartment. A sample of the heated topping was placed in the sample compartment and leveled even with the top of the side walls of the sample compartment. The gate was released, and a stopwatch was started simultaneously. Measurements, in centimeters, of the distance each topping flowed were taken after 30 seconds. The results in cm/30 seconds are referred hereinafter as Bostwick units.

DESCRIPTION OF THE DRAWING

The FIGURE is a cross-sectional side view of a pump suitable for use in the process of the present invention.

DESCRIPTION OF THE PREFERRED EMBODIMENT

The term ice cream sundae as used herein is meant in the generic sense to mean various topped desserts made with ice milk, custard, sherbert and the like.

In one advantageous embodiment, the present invention provides a method of making an ice cream sundae by first adding ice cream to a suitable container and then pumping the topping onto the ice cream in the container. The pumpable topping has a viscosity of from about 1000 to about 18,000 cps, and solids content of from about 40 to about 70 percent by weight of the topping. Various confectioneries are contemplated for the topping. One such confectionery is chocolate fudge. The chocolate fudge topping has a viscosity of about 18,000 cps at about 135° F. and a solids content of about 67 percent by weight of the topping. Further, the chocolate fudge topping has a pH of about 6.1. The chocolate fudge topping is heated to a temperature of from about 120 to about 130 degrees Fahrenheit to provide hot chocolate fudge. Another confectionery is chocolate syrup topping having a viscosity of from about 1000 to about 6,000 cps at about 72° F., and a solids content of about 66 percent by weight of the topping. The chocolate syrup topping has a pH of about 6.3. A further confectionery is butterscotch flavored syrup. The butterscotch topping has a viscosity of from about 6,000 to about 10,000 cps at about 72° F., and a solids content of about 70 percent by weight of the topping. The butterscotch topping has a pH of about 5.8. Each of the toppings, i.e., chocolate fudge, chocolate syrup, and butterscotch preferably have a water activity of less than 0.85.

In another advantageous embodiment, the present invention provides a method of making an ice cream sundae by first adding ice cream to a suitable container and then pumping the topping onto the ice cream in the container. The pumpable topping has a viscosity of from about 4 to about 12 Bostwick units, and solids content of from about 40 to about 50 percent by weight of the topping. Various fruit flavored toppings are contemplated. One such fruit flavoring is pineapple. The pineapple fruit topping has a viscosity of from about 6 to about 10 Bostwick units at about 72° F., and a pineapple solids content of about 40 percent by weight of the topping. The pineapple particles have a size of from about 1/16 to about 3/16 inches in diameter. The pineapple topping has a pH of about 3.5. Another fruit flavored topping is strawberry. The strawberry fruit topping has a viscosity of from about 8 to about 12 Bostwick units at about 72° F., and a strawberry solids content of about 40 percent by weight of the topping. The strawberry particles have a size range of from about 1/16 to about 3/16 of an inch in diameter. The strawberry topping has a pH of about 3.4. A further fruit flavored topping is apple. The apple topping has a viscosity of from about 4 to about 8 Bostwick units at about 72° F., and an apple solids content of about 40 percent by weight of the topping. The apple particles have a size range of from about 1/16 to about 3/16 of an inch in diameter. The apple topping has a pH of about 3.5. The apple topping can be served hot by heating it to a temperature of from about 120 to about 125 degrees Fahrenheit. Yet a further fruit flavored topping is boysenberry. The boysenberry topping has a viscosity of from about 4 to about 8 Bostwick units at about 72° F., and a boysenberry solids content of about 50 percent by weight of the topping. The boysenberry particle size is in the range of from about 1/16 to about 3/16 of an inch in diameter. The boysenberry topping has a pH of about 3.2. The boysenberry topping can be served hot by heating it to a temperature of from about 120 to about 125 degrees Fahrenheit.

The FIGURE depicts a hand operated pump, generally denoted as the numeral 10, suitable for pumping the topping. The pump 10 includes a reservoir 12 having a depending dip tube 14 which is adapted to extend downwardly into a storage container (not shown) of the topping to be pumped onto the ice cream. An antivator 16 includes a hollow flow tube 18 having its bottom end disposed into the reservoir 12 through an appropriate aperture 20 in the top end of the reservoir 12 and mounted for movement along its longitudinal axis into and out of the reservoir 12. A nozzle 22 is mounted at the top end of the flow tube 18 and in flow communication therewith. A check valve 24 in the form of a ball 26 and ball seat 28 is located within the flow tube 18 to allow the flow of topping only in the direction from the flow tube 18 into the nozzle. The bottom end of the flow tube 18 interior of the reservoir 12 includes a double lipped seal 30, the lips of which are in sealing contact with the interior wall surface of the reservoir 12 to prevent the flow of topping past the outer periphery of the flow tube 18 either into or out of the reservoir 12 as the flow tube 18 is moved out of and into the reservoir 12, respectively. A flexible flapper valve 32 is located inside the reservoir 12 over the opening of the dip tube 14 into the reservoir 12. The flow tube 18 is resiliently biased in the longitudinal direction out of the reservoir 12 by means of, for example, a coil spring 34 which has its bottom end in abuttment with the flapper valve 32 and its top end in abuttment with the bottom end of the flow tube 18. In addition to biasing the flow tube 18 upwardly of the reservoir 12, it also serves to hold the flapper valve 32 over the opening of the dip tube 14. In operation, the flow tube 18 is forced longitudinally downwardly into the reservoir by manually exerting a force on the top side of the nozzle 22. As the flow tube 18 is moved downwardly into the reservoir 12, air is forced out of the reservoir 12 past the check valve 24, thus, creating a low pressure in the reservoir 12. When the manual force is relieved from the nozzle 22, the biasing force of the spring 34 moves the flow tube 18 longitudinally out of the reservoir 12 causing topping to be sucked up the dip tube 14 from the topping container. The topping flowing upwardly in the dip tube 14 pushes against the flapper valve 32, displacing it a sufficient amount to allow the topping to flow into the reservoir 12. When the flow tube 18 is again manually forced longitudinally downwardly into the reservoir 12, the topping in the reservoir 12 is forced upwardly through the flow tube 18, lifting the ball 26 upwardly away from the valve seat 28, past the check valve 24 and through the nozzle 22 wherefrom it is dispensed onto the ice cream. Thus, only a premeasured amount of topping generally equal to the volume of the reservoir 12 is pumped out of the nozzle 22 with each stroke of the flow tube 18.

It has been found that these toppings can be pumped without readily clogging the pump nozzle as frequently occurs with heretofore known toppings.

The foregoing detailed description is given primarily for clearness of understanding and no unnecessary limitations should be understood therefrom for modifications will become obvious to those skilled in the art upon reading this disclosure and may be made without departing from the spirit of the invention and scope of the appended claims.

What is claimed is:

1. A method of making an ice cream sundae comprising the steps of:
    adding ice cream to a container; and,
    pumping a topping onto said ice cream by means of a hand operated pump which comprises a reservoir for said topping, means for drawing an amount of topping from a topping storage container into the reservoir preparatory to dispensing the topping onto the ice cream, and means for dispensing the topping from said reservoir onto the ice cream, said topping having a viscosity of from about 1,000 to about 18,000 cps, and solids content of from about 40 to about 70 percent by weight of said topping.

2. The method of claim 1, further comprising the steps of heating the topping to from about 120 to about 130 degrees Fahrenheit.

3. The method of claim 1, wherein the topping is a chocolate flavored fudge having a viscosity of about 18,000 cps at about 135° F., a solids content of about 67 percent by weight of the topping, and a pH of about 6.1.

4. The method of claim 3, further comprising the step of heating the topping to from about 120 to about 130 degrees Fahrenheit.

5. The method of claim 1, wherein the topping is a chocolate flavored syrup having a viscosity of from about 1,000 to about 6,000 cps at about 72° F., a solids content of about 66 percent by weight of the topping, and a pH of about 6.3.

6. The method of claim 1, wherein the topping is a butterscotch flavored syrup having a viscosity of from about 6,000 to about 10,000 cps at about 72° F., a solids content of about 70 percent by weight of the topping, and a pH of about 5.8.

7. A method of making an ice cream sundae comprising the steps of:
    adding ice cream to a container; and,
    pumping a topping onto said ice cream, said topping having a viscosity of from about 4 to about 12 Bostwick units, and solids of from about 40 to about 50 percent by weight of said topping.

8. The method of claim 7, wherein the topping has a solids size range of from about 1/16 to about 3/16 inches in diameter.

9. The method of claim 7, further comprising the step of heating the topping to from about 120 to about 125 degrees Fahrenheit.

10. The method of claim 7, wherein the topping is fruit flavored.

11. The method of claim 10, wherein the fruit flavor is pineapple, the topping having a viscosity of from about 6 to about 10 Bostwick units at about 72° F., a pineapple solids content of about 40 percent by weight of the topping and a pH of about 3.5.

12. The method of claim 11, wherein the pineapple solids having a particle size of from about 1/16 to about 3/16 inches in diameter.

13. The method of claim 10, wherein the fruit flavor is strawberry, the topping having a viscosity of from about 8 to about 12 Bostwick units at about 72° F., a strawberry solids content of about 40 percent by weight of the topping and a pH of about 3.4.

14. The method of claim 13, wherein the strawberry solids have a particle size of from about 1/16 to about 3/16 inches in diameter.

15. The method of claim 10, wherein the fruit flavor is apple, the topping having a viscosity of from about 4 to about 8 units at about 72° F., an apple solids content of about 40 percent by weight of the topping and a pH of about 3.5.

16. The method of claim 15, wherein the apple solids have a particle size of from about 1/16 to about 3/16 inches in diameter.

17. The method of claim 16, further comprising the step of heating the topping to a temperature of from about 120 to about 125 degrees Fahrenheit.

18. The method of claim 10, wherein the fruit topping is boysenberry, the topping having a viscosity of from about 4 to about 8 Bostwick units at about 72° F., a boysenberry solids content of about 50 percent by weight of the topping and a pH of about 3.2.

19. The method of claim 18, wherein the boysenberry solids have a particle size of from about 1/16 to about 3/16 inches in diameter.

20. The method of claim 19, further comprising the step of heating the topping to a temperature of from about 120 to 125 degrees Fahrenheit.

* * * * *